US010978697B2

(12) United States Patent
Son et al.

(10) Patent No.: US 10,978,697 B2
(45) Date of Patent: Apr. 13, 2021

(54) NEGATIVE ACTIVE MATERIAL FOR RECHARGEABLE LITHIUM BATTERY AND RECHARGEABLE LITHIUM BATTERY INCLUDING SAME

(71) Applicant: SAMSUNG SDI CO., LTD., Yongin-si (KR)

(72) Inventors: Dong-Ho Son, Yongin-si (KR); Kijun Kim, Yongin-si (KR); Hyo-Jung Song, Yongin-si (KR); Suyoun Yoon, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 20 days.

(21) Appl. No.: 16/540,590

(22) Filed: Aug. 14, 2019

(65) Prior Publication Data

US 2020/0067078 A1  Feb. 27, 2020

(30) Foreign Application Priority Data

Aug. 21, 2018  (KR) .......................... 10-2018-0097580

(51) Int. Cl.
*H01M 4/02* (2006.01)
*H01M 4/36* (2006.01)
*H01M 4/38* (2006.01)
*H01M 10/0525* (2010.01)
*H01M 4/587* (2010.01)

(52) U.S. Cl.
CPC ........... *H01M 4/364* (2013.01); *H01M 4/386* (2013.01); *H01M 4/587* (2013.01); *H01M 10/0525* (2013.01); *H01M 2004/027* (2013.01)

(58) Field of Classification Search
CPC ...................................................... H01M 4/02
See application file for complete search history.

(56) References Cited

U.S. PATENT DOCUMENTS

| 6,589,696 | B2 | 7/2003 | Matsubara et al. |
| 2010/0279172 | A1 | 11/2010 | Hwang et al. |
| 2015/0194698 | A1 | 7/2015 | Youm |
| 2018/0241079 | A1* | 8/2018 | Duong .................. H01M 4/043 |

FOREIGN PATENT DOCUMENTS

| JP | 2015-185446 A | 10/2015 |
| JP | 2005-317309 A | 11/2015 |
| KR | 10-2010-0118825 A | 11/2010 |
| KR | 10-2015-0083381 A | 7/2015 |
| KR | 10-2017-0111513 A | 10/2017 |

OTHER PUBLICATIONS

Korean Office action dated Nov. 2, 2020.

* cited by examiner

*Primary Examiner* — Jacob B Marks
(74) *Attorney, Agent, or Firm* — Lee IP Law, P.C.

(57) ABSTRACT

Disclosed are a negative active material for a rechargeable lithium battery and a rechargeable lithium battery including the same. The negative active material has an N/P ratio, which is a ratio of a maximum capacity per a unit area of a negative active material relative to maximum capacity per a unit area of a positive active material, ranging from about 1.5 to about 2. The negative active material includes a composite particle of silicon (Si) and carbon and crystalline carbon. A content of the Si is about 3 wt % to about 15 wt % based on a total weight of the negative active material.

7 Claims, 2 Drawing Sheets

NEGATIVE ACTIVE MATERIAL FOR RECHARGEABLE LITHIUM BATTERY AND RECHARGEABLE LITHIUM BATTERY INCLUDING SAME

CROSS-REFERENCE TO RELATED APPLICATION

Korean Patent Application No. 10-2018-0097580, filed on Aug. 21, 2018, in the Korean Intellectual Property Office, and entitled: "Negative Active Material for Rechargeable Lithium Battery and Rechargeable Lithium Battery Including Same," is incorporated by reference herein in its entirety.

BACKGROUND

1. Field

Embodiments relate to a negative active material for a rechargeable lithium battery and a rechargeable lithium battery including the negative active material.

2. Description of the Related Art

Various carbon-based materials including artificial graphite, natural graphite, and hard carbon capable of intercalating and deintercalating lithium ions or Si-based active materials including Si and Sn have been used as a negative active material.

SUMMARY

Embodiments are directed to a negative active material for a rechargeable lithium battery, the negative active material having an N/P ratio, which is a ratio of a maximum capacity per a unit area of a negative active material relative to maximum capacity per a unit area of a positive active material, ranging from about 1.5 to about 2. The negative active material includes a composite particle of silicon (Si) and carbon and crystalline carbon. A content of the Si is about 3 wt % to about 15 wt % based on a total weight of the negative active material.

The content of the Si may be about 35 wt % to about 65 wt % based on 100 wt % of the composite particle of Si and carbon.

The Si may have an average particle diameter (D50) of about 40 nm to about 100 nm.

The content of the Si may be about 5 wt % to about 10 wt % based on a total weight of the negative active material.

A mixing ratio of the composite particle of Si and carbon and the crystalline carbon may be a weight ratio of about 5:95 to about 45:55.

The composite particle may be an assembly of crystalline carbon, a silicon particle, and amorphous carbon.

Embodiments are also directed a rechargeable lithium battery including a negative electrode including a negative active material layer that includes the negative active material described above, a positive electrode including a positive active material; and a non-aqueous electrolyte.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
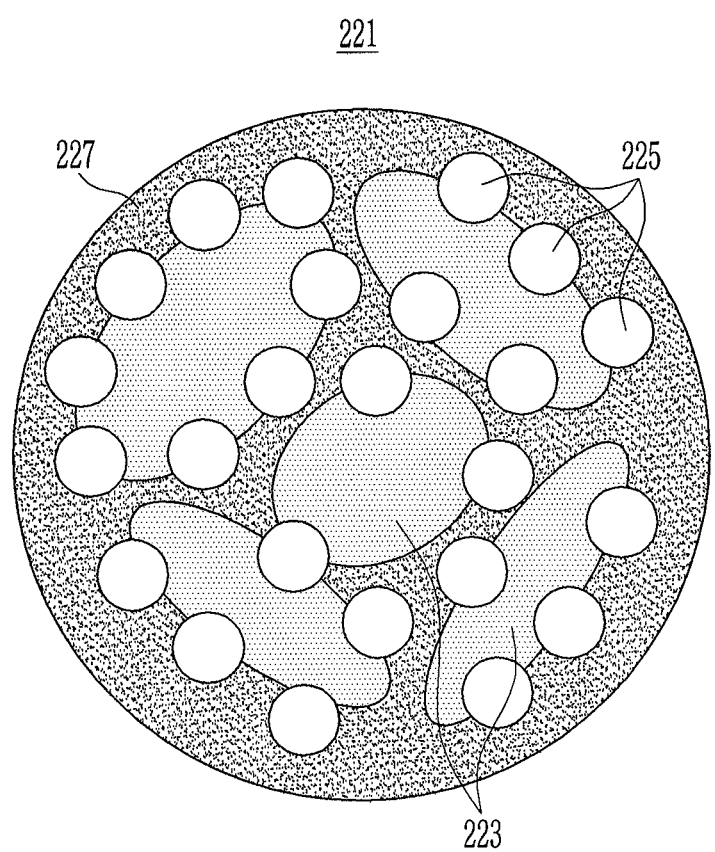
FIG. 1 illustrates a schematic view showing a structure of a silicon-carbon composite particle included in a negative active material according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration.

A negative active material for a rechargeable lithium battery according to an embodiment may include a composite particle of Si and carbon and crystalline carbon, wherein a content of the Si is about 3 wt % to about 15 wt % based on a total weight of the negative active material. In some implementations, the content of the Si may be about 5 wt % to about 10 wt % based on a total weight of the negative active material.

Such a negative active material may be for a rechargeable lithium battery having an N/P ratio ranging from about 1.5 to about 2, where the N/P ratio is defined as a ratio of a maximum capacity per a unit area of a negative active material to a maximum capacity per a unit area of a positive active material.

The negative electrode may be larger than the positive electrode. For example, the N/P ratio may be about 1.5 to about 2. A charge depth of the negative electrode may be controlled to be less than or equal to about 50% even when a 100% charge is performed. Thus, expansion of the negative electrode may be effectively suppressed. If the N/P ratio is greater than or equal to 1.5, a charge depth of the negative electrode may be less than about 50% at 100% charge and thus the expansion of the negative electrode may be effectively suppressed. When the N/P ratio is less than or equal to 2, irreversible capacity and a non-utilized negative electrode may be avoided and thus battery efficiency may be maintained.

In addition, when the aforementioned negative active material including the composite particle of Si and carbon and crystalline carbon, wherein the content of the Si is about 3 wt % to about 15 wt %, or, for example, about 5 wt % to about 10 wt % based on a total weight of the negative active material, is used as a negative active material for a rechargeable lithium battery having an N/P ratio of about 1.5 to about 2, improved swelling characteristics and cycle-life characteristics may be exhibited.

If the negative active material including the content of Si within the ranges is used for a rechargeable lithium battery having an N/P ratio of less than about 1.5, the swelling characteristics and cycle-life characteristics may be deteriorated. In addition, when the negative active material including the content of Si within the ranges is used for a rechargeable lithium battery having an N/P ratio exceeding 2, an inappropriate reduction of formation efficiency, capacity, and voltage may be occurred.

When the content of Si is within the ranges, degradation of deterioration of swelling characteristics, cycle-life characteristics, or capacity may be avoided.

The content of the Si in the composite particle may be about 35 wt % to about 65 wt %, or, for example, about 35 wt % to about 55 wt %, based on 100 wt % of the composite particle of Si and carbon. When the content of the Si is about 35 wt % to about 65 wt % based on 100 wt % of the composite particle of Si and carbon, swelling characteristics and cycle-life of the composite particle of Si and carbon may be improved.

In an embodiment, the average particle diameter (D50) of the Si may be about 40 nm to about 100 nm, or, for example, about 40 nm to about 85 nm. When the average particle diameter (D50) of the Si is within the ranges, the charge and discharge efficiency may be improved and active material expansion may be suppressed more effectively. As used herein, when a definition is not otherwise provided, the term "average particle diameter (D50)" indicates a particle diameter where a cumulative volume is about 50 volume % in a particle distribution.

A mixing ratio of the composite particle of Si and carbon and the crystalline carbon may be a weight ratio of about 5:95 to about 45:55. If the mixing ratio of the composite particle and the crystalline carbon is included within the ranges, irreversible capacity reduction may be minimized and the capacity of the battery may be increased. The Si content in the entire negative electrode may be minimized, thereby improving cycle-life characteristics and minimizing swelling.

The crystalline carbon may be natural graphite, artificial graphite, or a combination thereof.

The composite particle of Si and carbon may be an assembly form of crystalline carbon and Si. The composite particle may further include amorphous carbon. In some implementations, the composite particle may be an assembly form of crystalline carbon, Si, and amorphous carbon. The amorphous carbon may also be present between the assemblies of crystalline carbon and silicon, as well as covering the surfaces of the assemblies.

The crystalline carbon providing the composite particle of Si and carbon may be composed of primary particles or secondary particles in which primary particles are assembled. The crystalline carbon may be artificial graphite, natural graphite, or a combination thereof.

When the composite particle is a composite particle of Si and crystalline carbon, a content of crystalline carbon may be about 35 wt % to about 65 wt % based on 100 wt % of the composite particles. When the content of crystalline carbon in the composite particle is within the ranges, a desirable capacity may be obtained.

When the composite particle further includes amorphous carbon, a content of the amorphous carbon may range from about 5 wt % to about 45 wt % based on a total of 100 wt % of the composite particle. In this case, a content of the crystalline carbon may be about 45 wt % to about 5 wt %. When the content of the amorphous carbon in the composite particle is within the ranges, a desirable capacity may be obtained.

An example of the structure of the composite particle of Si and carbon illustrated shown in FIG. 1. The composite particle 221 of Si and carbon shown in FIG. 1 may include crystalline carbon 223, silicon particle 225, and amorphous carbon 227. The amorphous carbon 227 may be present between the assemblies of crystalline carbon 223 and silicon particle 225 and may surround the surfaces of the assemblies. In some implementations, the crystalline carbon 223 may be a secondary particle in which primary particles are assembled.

According to an embodiment, a rechargeable lithium battery may include a negative electrode, a positive electrode, and an electrolyte.

The negative electrode may include a current collector and a negative active material layer including the negative active material formed on the current collector.

In the negative active material layer, the negative active material may be included in an amount of about 95 wt % to about 99 wt % based on a total weight of the negative active material layer.

The negative active material layer may include a binder, and optionally, a conductive material. An amount of the binder may be about 1 wt % to about 5 wt % based on a total weight of the negative active material layer. When the conductive material is further included, about 90 wt %/o to about 98 wt % of the negative active material, about 1 wt % to about 5 wt % of the binder, and about 1 wt % to about 5 wt % of the conductive material may be used.

The binder may improve binding properties of negative active material particles with one another and with a current collector. The binder may include a non-aqueous binder, an aqueous binder, or a combination thereof.

The non-aqueous binder may include, for example, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be, for example, a styrene-butadiene rubber, an acrylated styrene-butadiene rubber (SBR), an acrylonitrile-butadiene rubber, an acrylic rubber, a butyl rubber, a fluorine rubber, an ethylenepropylene copolymer, polyepichlorohydrine, polyphosphazene, polyacrylonitrile, polystyrene, an ethylene propylenediene copolymer, polyvinylpyridine, chlorosulfonated polyethylene, a latex, a polyester resin, an acrylic resin, a phenolic resin, an epoxy resin, polyvinyl alcohol, or a combination thereof.

When the aqueous binder is used as the negative electrode binder, a cellulose-based compound may be used as a thickener to provide viscosity. The cellulose-based compound may include, for example, one or more of carboxymethyl cellulose, hydroxypropylmethyl cellulose, methyl cellulose, or an alkali metal salt thereof. The alkali metal may be Na, K, or Li. Such a thickener may be included in an amount of about 0.1 parts by weight to about 3 parts by weight based on 100 parts by weight of the negative active material.

The conductive material may be included to provide electrode conductivity. A suitable electrically conductive material that does not cause a chemical change may be used as a conductive material. Examples of the conductive material may include a carbon-based material such as natural graphite, artificial graphite, carbon black, acetylene black, ketjen black, a carbon fiber, or the like; a metal-based material of a metal powder or a metal fiber including copper, nickel, aluminum, silver, or the like; a conductive polymer such as a polyphenylene derivative; or a mixture thereof.

The current collector may include, for example, one selected from a copper foil, a nickel foil, a stainless steel foil, a titanium foil, a nickel foam, a copper foam, a polymer substrate coated with a conductive metal, or a combination thereof.

The positive electrode may include a current collector and a positive active material layer formed on the current collector, the active material layer including a positive active material.

The positive active material may be a compound (for example, a lithiated intercalation compound) being capable of intercalating and deintercalating lithium. For example, the positive active material may include one or more composite oxides of a metal selected from cobalt, manganese, nickel, and a combination thereof, and lithium. For example, the positive active material may be one or more compounds represented by one of the following chemical formulae. $Li_aA_{1-b}X_bD_2$ (0.90≤a≤1.8, 0≤b≤0.5); $Li_aA_{1-b}X_bO_{2-c}D_c$ (0.90≤a≤1.8, 0≤b≤0.5, 0≤c≤0.05); $Li_aE_{1-b}X_bO_{2-c}D_c$ (0.90≤a≤1.8, 0≤b≤0.5, 0≤c≤0.05); $Li_aE_{2-b}X_bO_{4-c}D_c$ (0.90≤a≤1.8, 0≤b≤0.5, 0≤c≤0.05); $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α<2); $Li_aNi_{1-b-c}Co_bX_cO_{2-\alpha}T_2$ (0.90≤a≤1.8, 0≤b≤0.5, 0≤c≤0.05, 0≤α<2); $Li_aN_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMn_{1-b}G_bO_2$ (0.90≤a≤1.8, 0.001≤b≤0.1); $Li_aMn_2G_bO_4$ (0.90≤a≤1.8, 0.001≤b≤0.1); $Li_aMn_{1-g}G_gPO_4$ (0.90≤a≤1.8, 0≤g≤0.5); $QO_2$; $QS_2$; $LiQS_2$; $V_2O_5$; $LiV_2O_5$; $LiZO_2$; $LiNiVO_4$; $Li_{(3-f)}J_2(PO_4)_3$ (0≤f≤2); $Li_{(3-f)}Fe_2(PO_4)_3$ (0≤f≤2); $Li_aFePO_4$ (0.90≤a≤1.8)

In the chemical formulae, A is selected from Ni, Co, Mn, and a combination thereof; X is selected from Al, Ni, Co, Mn, Cr, Fe, Mg, Sr, V, a rare earth element, and a combination thereof; D is selected from O, F, S, P, and a combination thereof; E is selected from Co, Mn, and a combination thereof; T is selected from F, S, P, and a combination thereof; G is selected from Al, Cr, Mn, Fe, Mg, La, Ce, Sr, V, and a combination thereof; Q is selected from Ti, Mo, Mn, and a combination thereof; Z is selected from Cr, V, Fe, Sc, Y, and a combination thereof; and J is selected from V, Cr, Mn, Co, Ni, Cu, and a combination thereof.

The compounds may have a coating layer on the surface thereof or may be mixed with another compound having a coating layer. The coating layer may include at least one coating element compound selected from an oxide of a coating element, a hydroxide of a coating element, an oxyhydroxide of a coating element, an oxycarbonate of a coating element, and a hydroxyl carbonate of a coating element. The compound for the coating layer may be amorphous or crystalline. The coating element included in the coating layer may include Mg, Al, Co, K, Na, Ca, Si, Ti, V, Sn, Ge, Ga, B, As, Zr, or a mixture thereof. The coating layer may be provided by a method that does not have an adverse influence on properties of a positive active material. For example, the method of providing the coating layer may include a suitable coating method such as spray coating, dipping, or the like.

In some implementations, the positive active material may include at least two types of $Li_aNi_{1-b-c}Co_bX_cD_\alpha$ (0.90≤a≤1.8, 0≤b≤0.5, 0≤c≤0.5, 0≤α≤2); $Li_aNi_{1-b-c}Co_bX_cO_{2-\alpha}T_\alpha$ (0.90≤a≤1.8, 0≤b≤0.5, 0≤c≤0.05, 0≤α≤2); $Li_aNi_{1-b-c}Co_bX_cO_{2-\alpha}T_2$ (0.90≤a≤1.8, 0≤b≤0.5, 0≤c≤0.05, 0≤α≤2); $Li_aNi_{1-b-c}Mn_bX_cD_\alpha$ (0.90≤a≤1.8, 0≤b≤0.5, 0≤c≤0.05, 0≤α≤2); $Li_aNi_{1-b-c}Mn_bX_cO_{2-\alpha}T_\alpha$ (0.90≤a≤1.8, 0≤b≤0.5, 0≤c≤0.05, 0≤α≤2); $Li_aNi_{1-b-c}Mn_bX_cO_{2-\alpha}T_2$ (0.90≤a≤1.8, 0≤b≤0.5, 0≤c≤0.05, 0≤α≤2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1), or a mixture of the nickel-based positive active material and another active material of the above chemical formulae of the positive active material except the nickel-based positive active material.

For example, as the nickel-based positive active material, $Li_aNi_{b1}Co_{c1}X_{d1}G_{z1}O_2$ (0.90≤a≤1.8, 0.5≤b1≤0.98, 0<c1≤0.3, 0<d1≤0.3, 0≤z1≤0.1, b1+c1+d1+z1=1, X is Mn, Al, or a combination thereof, and G is Cr, Fe, Mg, La, Ce, Sr, V, or a combination thereof) may be used.

When the components of the nickel-based positive active material are mixed, the mixing ratio may be suitably adjusted depending on the desired physical properties. For example, when the nickel-based positive active material is mixed with other active materials, a content of the nickel-based positive active material may be about 30 wt % to about 97 wt % based on a total weight of the positive active material.

In the positive electrode, a content of the positive active material may be about 90 wt % to about 98 wt % based on a total weight of the positive active material layer.

In an embodiment, the positive active material layer may further include a binder and a conductive material. The amount of each of the binder and the conductive material may be about 1 wt % to about 5 wt % based on a total weight of the positive active material layer.

The binder may improve binding properties of positive active material particles with one another and with a current collector. Examples of the binder may include polyvinyl alcohol, carboxymethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, or the like.

The conductive material may be included to provide electrode conductivity. A suitable electrically conductive material that does not cause a chemical change may be used as the conductive material. Examples of the conductive material may include a carbon-based material such as natural graphite, artificial graphite, carbon black, acetylene black, ketjen black, carbon fiber or the like; a metal-based material of a metal powder or a metal fiber including copper, nickel, aluminum, silver, or the like; a conductive polymer such as a polyphenylene derivative; or a mixture thereof.

The current collector may include an aluminum foil, a nickel foil, or a combination thereof, as examples.

The electrolyte may include a non-aqueous organic solvent and a lithium salt.

The non-aqueous organic solvent may serve as a medium for transmitting ions taking part in the electrochemical reaction of a battery.

The non-aqueous organic solvent may include a carbonate-based, ester-based, ether-based, ketone-based, alcohol-based, or aprotic solvent.

The carbonate based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), or the like. The ester-based solvent may include methyl acetate, ethyl acetate, n-propyl acetate, dimethylacetate, methylpropionate, ethylpropionate, decanolide, mevalonolactone, caprolactone, or the like. The ether-based solvent may include dibutyl ether, tetraglyme, diglyme, dimethoxyethane, 2-methyltetrahydrofuran, tetrahydrofuran, or the like. The ketone-based solvent includes cyclohexanone or the like. The alcohol-based solvent may include ethyl alcohol, isopropyl alcohol, or the like. Examples of the aprotic solvent include nitriles such as R-CN (where R is a C2 to C20 linear, branched, or cyclic hydrocarbon, or may include a double bond, an aromatic ring, or an ether bond), amides such as dimethylformamide, dioxanes such as 1,3-dioxolane, sulfolanes, or the like.

The organic solvent may be used alone or in a mixture. When the organic solvent is used in a mixture, the mixture ratio may be controlled in accordance with a desirable battery performance.

When the non-aqueous organic solvent is used in a mixture, a mixed solvent of a cyclic carbonate and a chain carbonate; a mixed solvent of a cyclic carbonate and a propionate based solvent; or a mixed solvent of a cyclic carbonate, a chain carbonate, and a propionate based solvent may be used. The propionate based solvent may be methyl propionate, ethyl propionate, propyl propionate, or a combination thereof.

When the cyclic carbonate and the chain carbonate or the cyclic carbonate and the propionate based solvent are mixed, they may be mixed in a volume ratio of about 1:1 to about 1:9. Thus, performance of an electrolyte solution may be improved. When the cyclic carbonate, the chain carbonate, and the propionate based solvent are mixed, they may be mixed in a volume ratio of about 1:1:1 to about 3:3:4. The mixing ratio of the solvents may be appropriately adjusted according to desirable properties.

The organic solvent may further include an aromatic hydrocarbon-based organic solvent in addition to the carbonate-based solvent. The carbonate-based solvent and the aromatic hydrocarbon-based organic solvent may be mixed in a volume ratio of about 1:1 to about 30:1.

The aromatic hydrocarbon-based organic solvent may be an aromatic hydrocarbon-based compound of Chemical Formula 1.

[Chemical Formula 1]

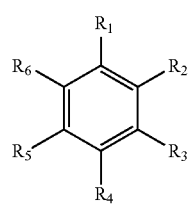

In Chemical Formula 1, $R_1$ to $R_6$ are the same or different and may be selected from hydrogen, a halogen, a C1 to C10 alkyl group, a haloalkyl group, and a combination thereof.

Specific examples of the aromatic hydrocarbon-based organic solvent may include benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trichlorotoluene, iodotoluene, 2,3-diiodotoluene, 2,4-diiodotoluene, 2,5-diiodotoluene, 2,3,4-triiodotoluene, 2,3,5-triiodotoluene, xylene, or a combination thereof.

The electrolyte may further include an additive such as a vinylene carbonate or an ethylene carbonate-based compound of Chemical Formula 2 in order to improve a cycle-life of a battery.

[Chemical Formula 2]

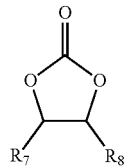

In Chemical Formula 2, $R_7$ and $R_8$ may be the same or different and may be selected from hydrogen, a halogen, a cyano group (CN), a nitro group ($NO_2$), and a fluorinated C1 to C5 alkyl group, provided that at least one of $R_7$ and $R_8$ is selected from a halogen, a cyano group (CN), a nitro group ($NO_2$), and a fluorinated C1 to C5 alkyl group, and $R_7$ and $R_8$ are not simultaneously hydrogen.

Examples of the ethylene carbonate-based compound may include difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. A suitable amount of the additive for improving the cycle-life of the rechargeable lithium battery may be used.

The lithium salt dissolved in an organic solvent supplies a battery with lithium ions, basically operates the rechargeable lithium battery, and improves transportation of the lithium ions between positive and negative electrodes. Examples of the lithium salt may include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, for example, an integer ranging from 1 to 20), LiCl, LiI, and $LiB(C_2O_4)_2$ (lithium bis(oxalato) borate: LiBOB). A concentration of the lithium salt may range from about 0.1 M to about 2.0 M. When the lithium salt is included in the above concentration range, an electrolyte may have improved performance and lithium ion mobility due to optimal electrolyte conductivity and viscosity.

The rechargeable lithium battery may further include a separator between the negative electrode and the positive electrode, depending on a kind of the battery. Examples of a suitable separator material include polyethylene, polypropylene, polyvinylidene fluoride, and multi-layers thereof such as a polyethylene/polypropylene double-layered separator, a polyethylene/polypropylene/polyethylene triple-layered separator, and a polypropylene/polyethylene/polypropylene triple-layered separator.

Figure 2:
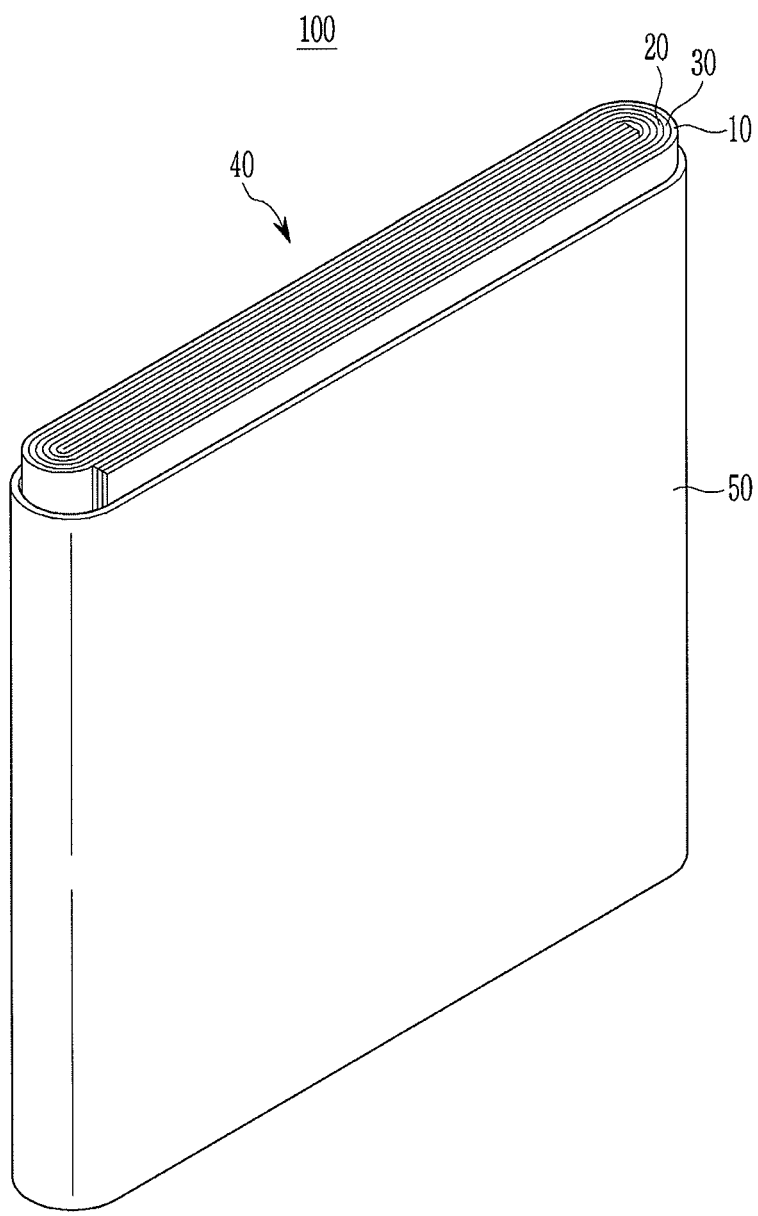
FIG. 2 illustrates a schematic view showing a structure of a rechargeable lithium battery according to an embodiment.

FIG. 2 illustrates an exploded perspective view of a rechargeable lithium battery according to an embodiment. The rechargeable lithium battery may be one of variously-shaped batteries such as a cylindrical battery, a pouch battery, or the like. According to an embodiment, the rechargeable lithium battery may be a prismatic battery.

Referring to FIG. 2, a rechargeable lithium battery 100 according to an embodiment may include an electrode assembly 40 manufactured by winding a separator 30 interposed between a positive electrode 10 and a negative electrode 20, and a case 50 housing the electrode assembly 40. An electrolyte may be impregnated in the positive electrode 10, the negative electrode 20, and the separator 30.

The following Examples and Comparative Examples are provided in order to highlight characteristics of one or more embodiments, but it will be understood that the Examples and Comparative Examples are not to be construed as limiting the scope of the embodiments, nor are the Comparative Examples to be construed as being outside the scope of the embodiments. Further, it will be understood that the embodiments are not limited to the particular details described in the Examples and Comparative Examples.

Example 1

20 wt % of composite particles of Si and carbon and 80 wt % of artificial graphite were mixed to prepare a negative active material, the composite particles having a form of assemblies of natural graphite and Si. The average particle diameter (D50) of the Si was 55 nm and the Si content was 50 wt %, based on 100 wt % of the composite particles. The Si content was 10 wt %, based on 100 wt % of the negative active material.

94 wt % of the negative active material, 3 wt % of an acetylene black conductive material, 1.0 wt % of a carboxymethyl cellulose thickener, and 2 wt % of a styrene-butadiene rubber binder were mixed in a pure water solvent to prepare a negative active material slurry. The slurry was coated onto a Cu foil current collector and then dried and compressed to manufacture a negative electrode.

96 wt % of a $LiCoO_2$ positive active material, 2 wt % of an acetylene black conductive material, and 2 wt % of a polyvinylidene fluoride binder were mixed in an N-methyl pyrrolidone solvent to prepare a positive active material slurry. The slurry was coated onto an Al foil current collector and then dried and compressed to manufacture a positive electrode.

The positive electrode, the negative electrode, and a non-aqueous electrolyte were used to manufacture a rechargeable lithium battery cell using a general process. As the non-aqueous electrolyte, a mixed solvent (3:7 volume ratio) of ethylene carbonate and diethyl carbonate in which 1.3 M $LiPF_6$ was dissolved was used. The use amounts of the positive active material and the negative active material were adjusted so that an N/P ratio, which is a ratio of a maximum capacity per a unit area of a negative active material relative to maximum capacity per a unit area of a positive active material, was 2.

Example 2

A rechargeable lithium battery cell was manufactured according to the same method as Example 1, except that the use amounts of the positive active material and the negative active material were adjusted so that the N/P ratio was 1.8.

Example 3

A rechargeable lithium battery cell was manufactured according to the same method as Example 1, except that the use amounts of the positive active material and the negative active material were adjusted so that the N/P ratio was 1.5.

Comparative Example 1

A rechargeable lithium battery cell was manufactured according to the same method as Example 1, except that the use amounts of the positive active material and the negative active material were adjusted so that the N/P ratio was 2.2.

Comparative Example 2

A rechargeable lithium battery cell was manufactured according to the same method as Example 1, except that the use amounts of the positive active material and the negative active material were adjusted so that the N/P ratio was 1.3.

Comparative Example 3

A rechargeable lithium battery cell was manufactured according to the same method as Example 1, except that the use amounts of the positive active material and the negative active material were adjusted so that the N/P ratio was 1.1.

Example 4

10 wt % of composite particles of Si and carbon and 90 wt % of artificial graphite were mixed to prepare a negative active material. The composite particles were in a form of assemblies of natural graphite and Si. The average particle diameter (D50) of the Si was 55 nm and the Si content was 50 wt %, based on 100 wt % of the composite particles. The Si content was 5 wt %, based on 100 wt % of the negative active material.

A rechargeable lithium battery cell was manufactured according to the same method as Example 2 using the obtained negative active material.

Example 5

15 wt % of composite particles of Si and carbon and 85 wt % of artificial graphite were mixed to prepare a negative active material. The composite particles were in a form of assemblies of natural graphite and Si. The average particle diameter (D50) of the Si was 55 nm and the Si content was 50 wt %, based on 100 wt % of the composite particles. The Si content was 7.5 wt % based on 100 wt % of the negative active material.

A rechargeable lithium battery cell was manufactured according to the same method as Example 2 using the obtained negative active material.

Example 6

25 wt % of composite particles of Si and carbon and 75 wt % of artificial graphite were mixed to prepare a negative active material. The composite particles were in a form of assemblies of natural graphite and Si. The average particle diameter (D50) of the Si was 55 nm and the Si content was 50 wt % based on 100 wt % of the composite particles. The Si content was 12.5 wt % based on 100 wt % of the negative active material.

A rechargeable lithium battery cell was manufactured according to the same method as Example 2 using the obtained negative active material.

Cycle-Life Characteristics

The rechargeable lithium battery cells manufactured according to Examples 1 to 6 and the Comparative Examples 1 to 3 were subjected to 100 times charging and discharging at 1 C to obtain a ratio of the $100^{th}$ discharge capacity relative to the $1^{st}$ cycle discharge capacity. The results with respect to Examples 1 to 3 and Comparative Examples 1 to 3 are shown in Table 1, and the results with respect to Example 2 and Example 4 to 6 are shown in Table 2.

Evaluation of Swelling Characteristics

The rechargeable lithium battery cells manufactured according to Examples 1 to 6 and the Comparative Examples 1 to 3 were subjected to 100 times charge and discharge at 1 C. Battery cell thicknesses before charge and discharge and battery cell thicknesses after 100 times charging and discharging were measured respectively. Thereby, the battery thickness % after 100 times charging and discharging relative to 100% of the thickness before charging and discharging was obtained. The results with respect to Examples 1 to 3 and Comparative Examples 1 to 3 are shown in Table 1, and the results with respect to Example 2 and Example 4 to 6 are shown in Table 2.

Capacity Measurement

The rechargeable lithium battery cells manufactured according to Examples 1 to 6 and the Comparative Examples 1 to 3 were subjected to one charging and discharging to measure the discharge capacity. The results with respect to Examples 1 to 3 and Comparative Examples 1 to 3 are shown in Table 1, and the results with respect to Example 2 and Example 4 to 6 are shown in Table 2.

In Tables 1 and 2, the Si content is based on a total weight (100 wt %) of the negative active material.

TABLE 1

|  | Si content (wt %) | N/P ratio | Capacity retention (%) | Thickness increase rate (%) | Discharge capacity (mAh/cc) |
| --- | --- | --- | --- | --- | --- |
| Comparative Example 1 | 10 | 2.2 | 93 | 106 | 233 |
| Example 1 | 10 | 2 | 92 | 105 | 262 |
| Example 2 | 10 | 1.8 | 90 | 114 | 279 |
| Example 3 | 10 | 1.5 | 86 | 128 | 311 |
| Comparative Example 2 | 10 | 1.3 | 76 | 144 | 337 |
| Comparative Example 3 | 10 | 1.1 | 48 | 162 | 367 |

As shown in Table 1, the battery cells having an N/P ratio of 1.5 to 2 using negative active materials wherein the Si content was 10 wt % based on a total weight of 100 wt % of the negative active material according to Example 1 to 3 exhibited improved capacity retention, a low thickness increase rate, and a high discharge capacity.

In contrast, in the case of the battery cells having an N/P ratio of 1.3 and 1.1 according to Comparative Examples 2 and 3, even when a negative active material having a Si content of 10 wt % based on 100 wt % of the negative active material was used, the discharge capacity was high but the capacity retention was significantly lower and the thickness increase rate in was very high.

In the case of Comparative Example 1 having the N/P ratio of 2.2, the capacity retention and the thickness increase rate were suitable even when the negative active material wherein the Si content was 10 wt % based on 100 wt % of the negative active material was used. However, the discharge capacity was very low.

TABLE 2

|  | Si content (wt %) | N/P ratio | Capacity retention (%) | Thickness increase rate (%) | Discharge capacity (mAh/cc) |
| --- | --- | --- | --- | --- | --- |
| Example 4 | 5 | 1.8 | 94 | 106 | 248 |
| Example 5 | 7.5 | 1.8 | 93 | 107 | 264 |
| Example 2 | 10 | 1.8 | 90 | 114 | 279 |
| Example 6 | 12.5 | 1.8 | 82 | 131 | 293 |

As shown in Table 2, the battery cells having the N/P ratio of 1.8 according to Examples 2 and 4 to 6 using the negative active materials wherein the Si content was 5 wt % to 12.5 wt % exhibited improved capacity retention, low thickness increase rate, and high discharge capacity. Examples 2, 4 and 5 using the negative active materials wherein the Si contents were 5 wt % to 10 wt % exhibited a capacity retention of greater than or equal to about 90% and a very low thickness increase rate.

By way of summation and review, technology development for realizing high capacity of a rechargeable lithium battery has been continuously made due to an increasing demand on a mobile equipment or a portable battery.

As an electrolyte of a rechargeable lithium battery, a lithium salt dissolved in an organic solvent has been used.

As for a positive active material of a rechargeable lithium battery, a lithium-transition metal oxide having a structure capable of intercalating lithium ions such as $LiCoO_2$, $LiMn_2O_4$, $LiNi_{1-x}Co_xO_2$ (0<x<1), and the like has been used.

As for a negative active material, various carbon-based materials including artificial graphite, natural graphite, and hard carbon capable of intercalating and deintercalating lithium ions or Si-based active materials including Si and Sn have been used. In recent years, Si-based negative active materials have been getting attention as high-capacity batteries become more desirable. However, with Si-based negative active materials a cycle-life may be limited due to a high expansion rate of the active material.

A Si-based negative active material may repeatedly shrink/expand when charging and discharging are repeated. A solid electrode interface (SEI) may be formed on the surface of the negative active material, and irreversible capacity may be increased due to an increase of side reactions and thus, cycle-life characteristics may be deteriorated.

Embodiments advance the art by providing a negative active material for a rechargeable lithium battery that effectively suppresses swelling and expansion upon charge and discharge and therefore exhibits excellent cycle-life characteristics. Embodiments further provide a rechargeable lithium battery including the negative active material.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A negative active material for a rechargeable lithium battery, the negative active material having an N/P ratio, which is a ratio of a maximum capacity per a unit area of a negative active material relative to maximum capacity per a unit area of a positive active material ranging from about 1.5 to about 2, Wherein:
the negative active material includes crystalline carbon and a composite particle of silicon (Si) and carbon, and a content of the Si is about 3 wt % to about 15 wt % based on a total weight of the negative active material.

2. The negative active material as claimed in claim 1, wherein the content of the Si is about 35 wt % to about 65 wt %, based on a total weight of the composite particle of Si and carbon.

3. The negative active material as claimed in claim 1, wherein the Si has an average particle diameter (D50) of about 40 nm to about 100 nm.

4. The negative active material as claimed in claim 1, wherein the content of the Si is about 5 wt % to about 10 wt %, based on a total weight of the negative active material.

5. The negative active material as claimed in claim 1, wherein a weight ratio of the composite particle of Si and carbon and the crystalline carbon is about 5:95 to about 45:55.

6. The negative active material as claimed in claim 1, wherein the composite particle of Si and carbon is an assembly of crystalline carbon, a silicon particle, and amorphous carbon.

7. A rechargeable lithium battery, comprising
 a negative electrode including a negative active material layer including the negative active material as claimed in claim 1;
 a positive electrode including a positive active material; and
 a non-aqueous electrolyte.

\* \* \* \* \*